US009325417B2

(12) United States Patent
Yu et al.

(10) Patent No.: US 9,325,417 B2
(45) Date of Patent: Apr. 26, 2016

(54) OPTICAL-ELECTRICAL CONVERTER

(71) Applicant: Formerica Optoelectronics Inc., Hsinchu County (TW)

(72) Inventors: Tung-Yi Yu, Hsinchu County (TW); Sheng-Wei Wu, Hsinchu County (TW); Chien-Te Cheng, Taipei (TW)

(73) Assignee: FORMERICA OPTOELECTRONICS INC., Hsinchu County (TW)

( * ) Notice: Subject to any disclaimer, the term of this patent is extended or adjusted under 35 U.S.C. 154(b) by 0 days.

(21) Appl. No.: 14/315,016

(22) Filed: Jun. 25, 2014

(65) Prior Publication Data
US 2015/0003835 A1 Jan. 1, 2015

(30) Foreign Application Priority Data
Jun. 27, 2013 (TW) .............................. 102122897 A

(51) Int. Cl.
*H04B 10/60* (2013.01)
*H04B 10/80* (2013.01)
*G02B 6/42* (2006.01)
*H04B 10/40* (2013.01)

(52) U.S. Cl.
CPC .............. *H04B 10/40* (2013.01); *G02B 6/4262* (2013.01); *G02B 6/4277* (2013.01); *G02B 6/4292* (2013.01); *H04B 10/801* (2013.01); *G02B 6/4284* (2013.01)

(58) Field of Classification Search
CPC ...... G02B 6/3821; G02B 6/3869; G02B 6/32; G02B 6/3861; G02B 6/3887; G02B 6/3841; G02B 6/3885; G02B 6/3835; G02B 6/3863; G02B 6/4262; G02B 6/4277; G02B 6/4292; G02B 6/4284; H04B 10/40; H04B 10/81
See application file for complete search history.

(56) References Cited

U.S. PATENT DOCUMENTS

| 2005/0238358 | A1* | 10/2005 | Light | 398/135 |
| 2005/0286579 | A1* | 12/2005 | Yoshikawa et al. | 372/36 |
| 2009/0067849 | A1* | 3/2009 | Oki et al. | 398/136 |
| 2009/0148108 | A1* | 6/2009 | Fukutomi | 385/92 |
| 2014/0133803 | A1* | 5/2014 | Rosenberg et al. | 385/33 |

* cited by examiner

*Primary Examiner* — David Payne
*Assistant Examiner* — Casey Kretzer
(74) *Attorney, Agent, or Firm* — Chun-Ming Shih

(57) ABSTRACT

An optical-electrical converter includes a converter body, two optical-electrical conversion modules and a housing. One end of the converter body is provided with an optical fiber insertion port. The optical-electrical conversion modules are arranged on two sides of the converter body to perform conversion of optical-electrical signal, respectively. The housing is used for covering a portion of the converter body to shield the optical-electrical conversion modules. Because of multiple optical-electrical conversion modules provided by the optical-electrical converter, the arrangement number and volume of the optical-electrical converter in optical fiber network equipment may be reduced significantly to comply with the miniaturization trend of optical fiber network equipment.

7 Claims, 4 Drawing Sheets

OPTICAL-ELECTRICAL CONVERTER

CROSS-REFERENCE TO RELATED APPLICATIONS

This application claims the priority of Republic of China Patent Application No. 102122897 filed on Jun. 27, 2013, in the State Intellectual Property Office of the R.O.C., the disclosure of which is incorporated herein by reference

BACKGROUND OF THE INVENTION

1. Field of the Invention

The invention relates to an optical-electrical converter, more specifically to an optical-electrical converter provided with multiple optical-electrical conversion modules in parallel.

2. Descriptions of the Related Art

As the rapid development of network communication technology, the bandwidth and speed of network transmission keep on increasing, such that optical fiber cables capable of rapid and a large amount of signal transmission are employed widely in optical fiber network communication in various industries and between various equipments.

In optical fiber network, an optical fiber network equipment (for example, network card) has to be configured with an optical-electrical converter. The optical-electrical converter may convert optical signal in the optical fiber network into electrical signal for the optical fiber network equipment to process, also may convert electrical signal of the optical fiber network equipment into optical signal which is transmitted to the optical fiber network in order to accomplish network communication of the optical fiber network equipment. Because the volume of current optical fiber network equipment is regulated to miniaturization gradually to be applicable to various use situations, such as home life, the size of the optical-electrical converter that can be configured inside the optical fiber network equipment is constrained severely, so that the functionality of the optical fiber network equipment is not as expected. However, more spaces have to be configured for the optical-electrical converter if an optical-electrical converter is to be added in the optical fiber network equipment to meet the requirement of network function. As such, the volume of the optical fiber network equipment would be too large.

Therefore, it has become the issue of interest by those skilled in the art about how to provide an optical-electrical converter with small volume in order for the optical fiber network equipment configured with optical-electrical converter to comply with the development trend of miniaturization.

SUMMARY OF THE INVENTION

In view of various problems of prior arts mentioned above, mainly object of the invention is to provide an optical-electrical converter clustering multiple sets of optical-electrical conversion modules in order to reduce the space necessary to arrange the optical fiber network equipment, and comply with the development trend of the optical fiber network equipment with respect to miniaturization.

Secondary object of the invention is to provide an optical-electrical converter arranging multiple optical fiber insertion openings clustered in one area, in order to reduce the area for exposing the optical fiber insertion openings such that it may be configured in various small sized optical fiber network equipment.

To achieve above object and other object, an optical-electrical converter of the invention is configured in an optical fiber network equipment for an optical fiber to insert, in which optical signal of the optical fiber can be converted into electrical signal which is transmitted to the optical fiber network equipment, in addition, the electrical signal of the optical fiber network equipment can be converted into optical signal which is transmitted to the optical fiber. The optical-electrical converter comprises a converter body, two optical-electrical conversion modules and a housing. One end of the converter body is provided with an optical fiber insertion port, the optical fiber insertion port protruding from the optical fiber network equipment. The optical-electrical conversion modules provided on two sides of the converter body, respectively, to perform conversion of optical-electrical signal. Each of the optical-electrical conversion modules being provided with an optical fiber joint and an electrical signal transmission port. The optical fiber joint is through the optical fiber insertion port in a first direction and exposed for the optical fiber to insert. The electrical signal transmission port extends in a second direction perpendicular to the first direction for inserting electrically a circuit substrate of the optical fiber network equipment. The housing for covering a portion of the converter body to shield each of the optical-electrical conversion modules.

Preferably, the optical fiber joints of the optical-electrical conversion modules comprise an optical signal input joint and an optical signal output joint in order to input and output optical signal, respectively. The optical fiber insertion port may be arranged with multiple optical fiber insertion openings in the form of a traditional Chinese word "III" to reduce the surface area necessary for exposure, such that the optical fiber insertion port may be configured in various small sized optical fiber network equipment. The housing is constituted by surrounded a plate to form a containing space in an interior and an opening portion and a stopping portion on two ends. The converter body may enter the containing space through the opening portion until touching the stopping portion. An inner wall of the housing is provided with a fit portion in order to engage and position the converter body entering the containing space. The converter body is provided with an concave or convex engagement portion in the location corresponding to the fit portion in order to accomplish the engagement with the housing in compliance with the fit portion. The housing further has a baffle extended on a side on one end with the opening portion such that the baffle may be bent downward to close the opening portion for prevention of the converter body from leaving the containing space as the converter body touches the stopping portion.

Furthermore, the housing further has a pin connected electrically with a ground end on the circuit substrate of the optical fiber network equipment to transmit an EMI signal to the ground end on the circuit substrate. Two sides of an outer wall of the housing are protruded with an elastic portion in order for butting against the optical fiber network equipment elastically and maintaining a state of the optical fiber insertion port protruding from the optical fiber network equipment for prevention of the optical fiber insertion port into the optical fiber network equipment or shaking.

In comparison to the prior art, the optical-electrical converter provided in the invention is arranged with multiple optical-electrical conversion modules in parallel to improve networking function of the configured optical fiber network equipment, in addition to reduce the arrangement number of the optical-electrical converter in the optical fiber network equipment substantially. The optical fiber insertion port exposed to the optical-electrical converter is arranged with multiple optical fiber insertion openings in the form of a traditional Chinese word "田" to reduce the surface area necessary for exposure.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
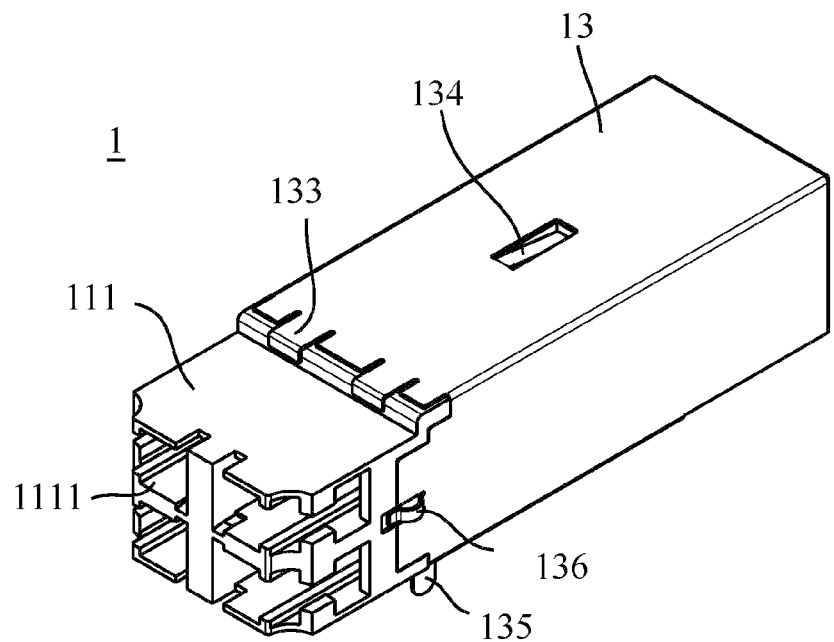
FIG. 1 is a stereo schematic showing an optical-electrical converter according to the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The invention provides an optical-electrical converter clustering multiple sets of optical-electrical conversion module to reduce an arrangement space that an optical fiber network equipment is necessary to reserve for the optical-electrical converter in order for volume reduction of the optical fiber network equipment to comply with the development trend of the optical fiber network equipment with respect to miniaturization. The optical fiber network equipment is, for example, a multi-port network card inserted in a server. Due to the requirement of customers, the volume of the server cannot be too large such that the area of the network card for exposing the optical fiber insertion port is limited. The optical-electrical converter of the invention is arranged by clustering multiple optical fiber insertion openings in one area to reduce the region for exploring exposing the optical fiber insertion openings, and further, may be configured for multi-port network card of various small sized server. Of course, the optical-electrical converter of the invention may also be applicable to other optical fiber network equipment not limited to network card purpose.

The optical-electrical converter of the invention is configured in the optical fiber network equipment for an optical fiber connecting the an optical fiber network to insert, such that the optical fiber network equipment may connect the optical fiber network. The optical-electrical converter may convert optical signal of the inserted optical fiber into electrical signal which is transmitted to the optical fiber network equipment for process, and may convert electrical signal generated in running the optical fiber network equipment into optical signal which is transmitted to the optical fiber network through the optical fiber. Refer to FIGS. 1 to 5, which are structure schematics showing the optical-electrical converter according to the invention. As shown in the Figures, the optical-electrical converter 1 of the invention includes a converter body 11, two optical-electrical conversion modules 12 and a housing 13. One end of the converter body 11 is provided an optical fiber insertion port 111. The optical fiber insertion port 111 may protrude the optical fiber network equipment and exposes multiple optical fiber insertion openings 1111 for the optical fiber of the optical fiber network to insert in order for transmission of optical signal. Two optical-electrical conversion modules 12 are arranged in parallel and are provided on two sides of the converter body 11, respectively. Each of the optical-electrical conversion modules 12 may perform conversion of optical-electrical signal individually. Each of the optical-electrical conversion modules 12 may be in sheet design, and may be locked to the two sides of the converter body 11 by locking pieces, such as screws, respectively.

Figure 2:
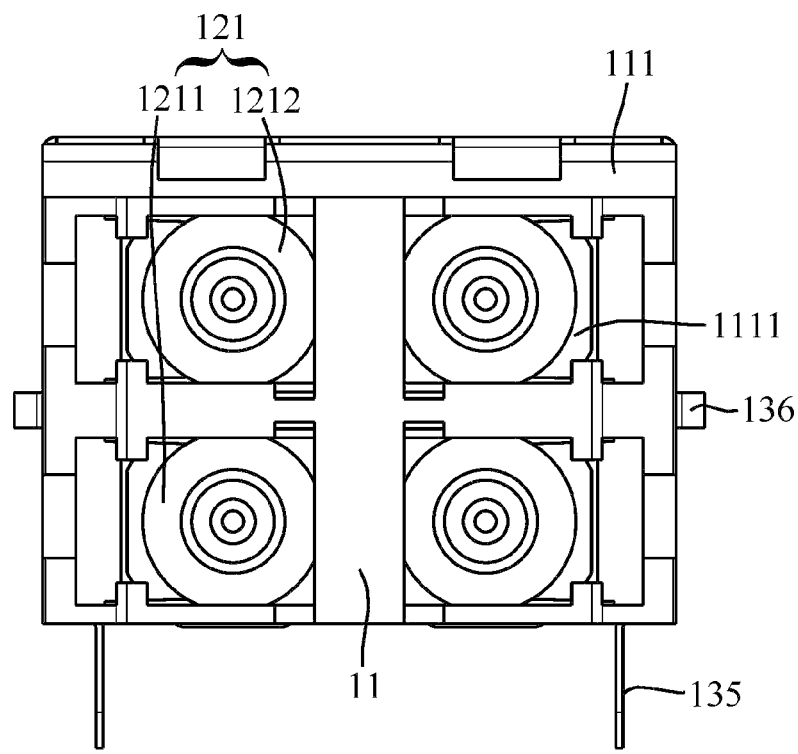
FIG. 2 is a top view showing the optical-electrical converter according to the invention.

Two ends of the optical-electrical conversion modules 12 are provided with an optical fiber joint 121 and an electrical signal transmission port 122. The optical fiber joint 121 is exposed through optical fiber insertion port 111 in the first direction (that is, the direction marked with symbol D1 in FIG. 3) for the optical fiber of the optical fiber network to insert in order to input optical signal to the optical-electrical conversion modules 12, or output optical signal of the optical-electrical conversion modules 12. Thus, the optical fiber joint 121 comprises an optical signal input joint 1211 and an optical signal output joint 1212. As shown in FIG. 2, the optical fiber insertion port 111 has multiple optical fiber insertion openings 1111 arranged in the form of a traditional Chinese word "田" to expose the optical signal input joint 1211 and the optical signal output joint 1212.

The electrical signal transmission port 122 extends in the second direction (that is, the direction marked by symbol D2 in FIG. 3) perpendicular to the first direction for inserting a circuit substrate of the optical fiber network equipment electrically in order for transmission of electrical signal. The electrical signal transmission port 122 is, for example, the so called golden finger.

The housing 13 is constituted by surrounded bent plate material such that a containing space 131, an opening portion 132 and a stopping portion 133 are formed in and on the interior and the both ends, respectively. The converter body 11 may be guided through the opening portion 132 and the inner wall of the housing 13 to enter the containing space 131 until touching the stopping portion 133. The housing 13 may cover the portion of the converter body 11 with the optical-electrical conversion modules 12 arranged in order to provide shielding for each of the optical-electrical conversion modules 12 provided on the converter body 11 such that the effect of blocking external EMI is provided. Moreover, the housing 13 has a baffle 137 extended on a side on one end with the opening portion 132 formed such that the baffle 137 can be bent downward to close the opening portion 132 for prevention of the converter body 11 from leaving the containing space 131 as the converter body 11 touches the stopping portion 133. The stopping portion 133 and the baffle 137 are formed by bending the plate material which constitutes the housing 13. Correspondingly, the converter body 11 is further formed with a flange 113 for the stopping portion 133 to touch.

Figure 3:
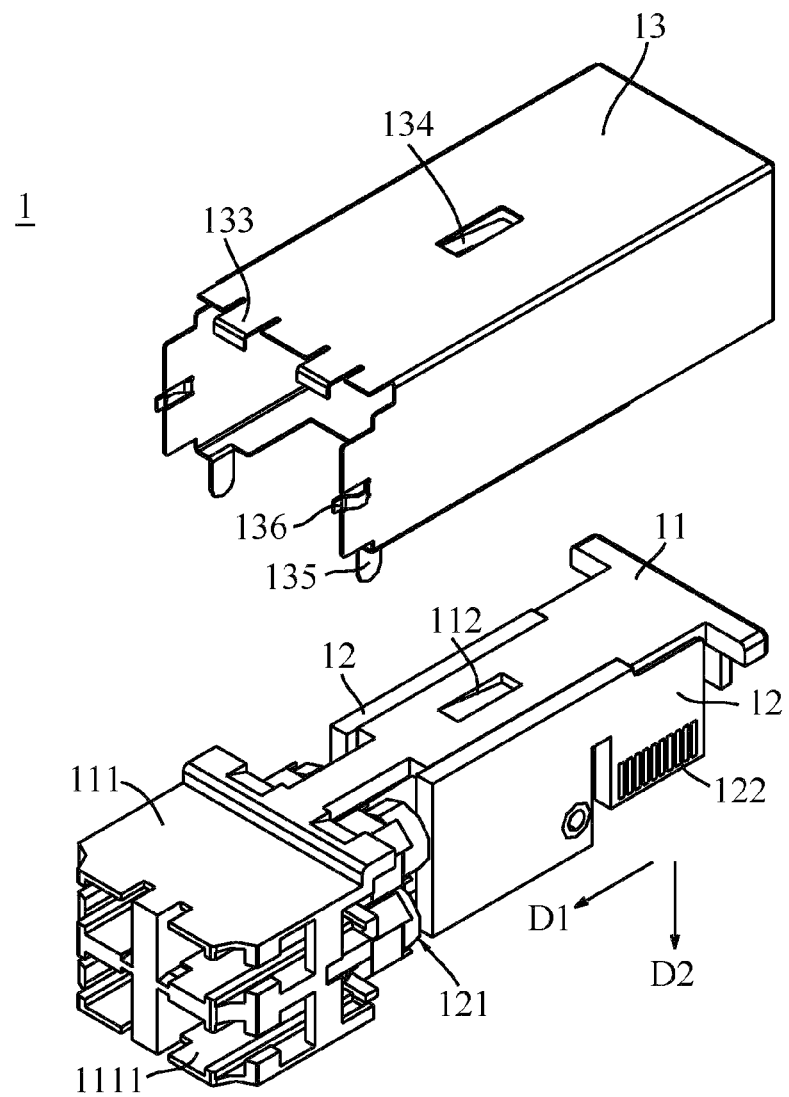
FIG. 3 is an exploded schematic showing a converter body and a housing of the optical-electrical converter according to the invention.
Figure 4:
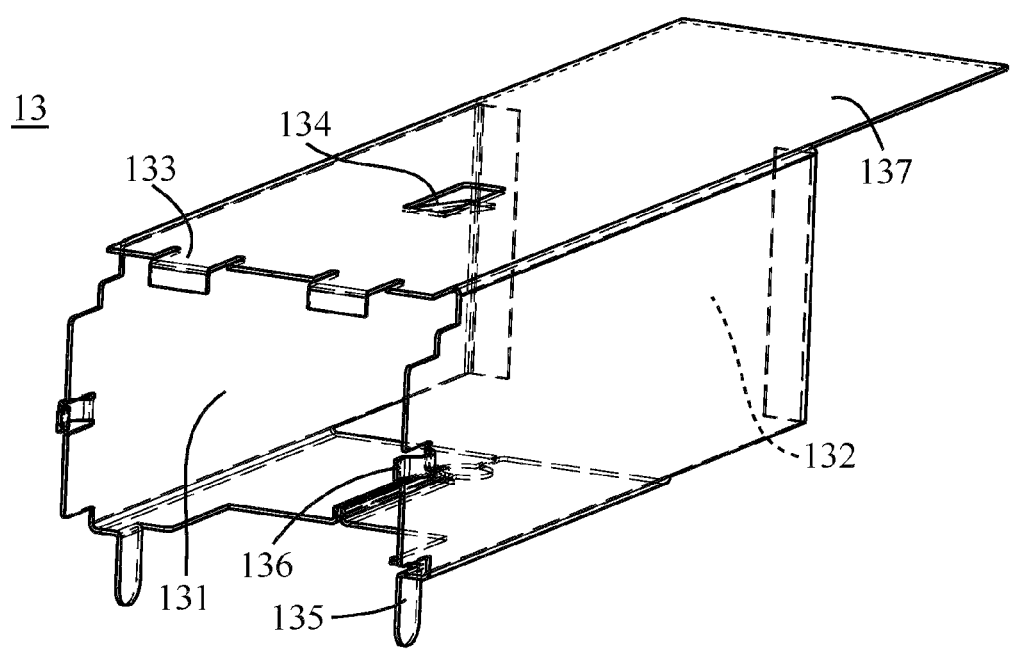
FIG. 4 is an enlarged view showing the housing according to the invention.
Figure 5:
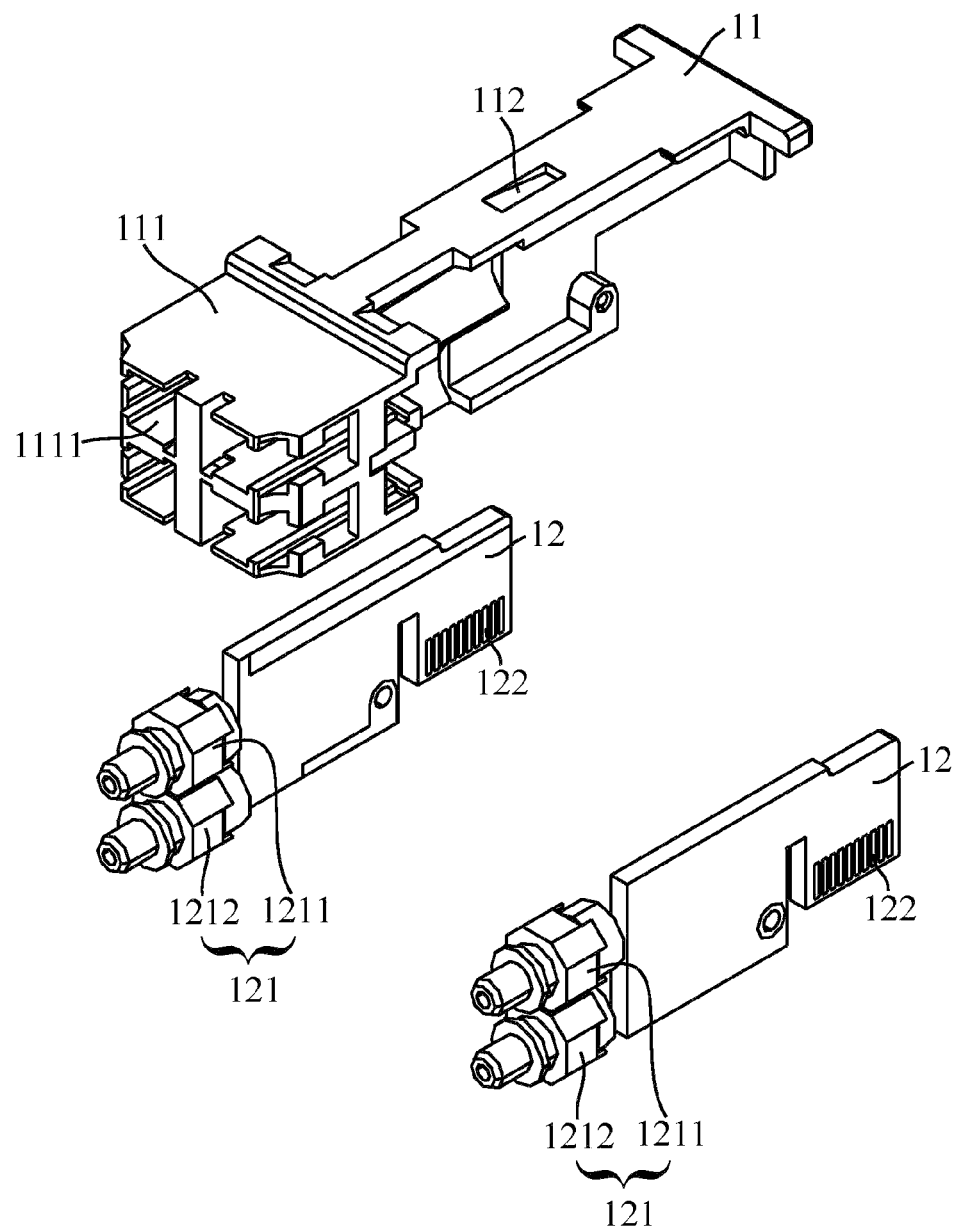
FIG. 5 is an exploded view showing the converter body and optical-electrical conversion module in the optical-electrical converter according to the invention.

In one example of the invention, the inner wall of the housing 13 further has a fit portion 134 formed by bending the plate material in order to engage and position the converter body 11 entering the containing space 131. Correspondingly, the converter body 11 in which location corresponds to the fit portion 134 is provided with an concave or convex engagement portion 112 such that the engagement with the housing 13 is accomplished in conjunction with the fit portion 134. As shown in FIG. 3, the engagement portion 112 has a guiding slope used to guide the fit portion 134 for entering until the fit portion 134 touches the wall around the engagement portion 112.

The two sides of the outer wall of the housing 13 are protruded with an elastic portion 136. In fitting the optical-electrical converter 1 to the optical fiber network equipment, the elastic portion 136 bears pressure to deform in order for the optical fiber insertion port 111 to protrude from the optical fiber network equipment smoothly. After the optical fiber insertion port 111 is protruded, the elastic portion 136 has reduced born force to restore elastically until butting against the optical fiber network equipment, while the state in which the optical fiber insertion port 111 protrudes from the optical fiber network equipment may be maintained with elastic force. The elastic portion 136 may be formed by bending the plate material of the housing 13, but is not limited thereto. It may also be formed in the converter body 11.

In addition, the housing 13 also has a pin 135 connected electrically with a ground end on the circuit substrate of the optical fiber network equipment to transmit an EMI signal to the ground end on the circuit substrate in order to provide EMI protection for the optical-electrical conversion modules 12 provided on the converter body 11.

In summary, the optical-electrical converter of the invention has the following technical properties:

1. Multiple optical-electrical conversion modules are arranged to reduce the arrangement number and volume of the optical-electrical converter in the optical fiber network equipment to meet the miniaturization requirement of the optical fiber network equipment.

2. The multiple optical fiber insertion openings of the optical fiber insertion port arranged in the form of a traditional Chinese word " 田 " is arranged for a single optical fiber insertion port to be inserted by optical fibers of multiple optical fiber networks in order to improve the networking function of the optical fiber network equipment.

3. An optical-electrical converter is arranged multiple optical fiber insertion openings clustered in one area, in order to reduce the region for exposing the optical fiber insertion openings such that the optical-electrical converter may be configured in various small sized optical fiber network equipment.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An optical-electrical converter configured in an optical fiber network equipment, in which a first optical signal of an optical fiber can be converted into a first electrical signal which is transmitted to the optical fiber network equipment, in addition, a second electrical signal of the optical fiber network equipment can be converted into a second optical signal which is transmitted to the optical fiber, the optical-electrical converter comprising:

a converter body, one end of which being provided with an optical fiber insertion port, the optical fiber insertion port protruding from the optical fiber network equipment;

two optical-electrical conversion modules provided on two sides of the converter body, respectively, to perform conversion of optical-electrical signals, two ends of each of the optical-electrical conversion modules being provided with an optical signal input joint and an optical signal output joint, and an electrical signal transmission port, respectively; the optical signal input joint and the optical signal output joint being exposed for optical fibers passing through the optical fiber insertion port to insert; the electrical signal transmission port being inserted electrically into a circuit substrate of the optical fiber network equipment; and a housing installed on the converter body to shield the optical-electrical conversion modules and the optical fiber insertion port protruding out of the housing, wherein the housing is constituted by a plate being folded to form a containing space in an interior and an opening portion and a stopping portion on two ends, the converter body except for the optical fiber insertion port being disposed in the containing space and the stopping portion being engaged on the optical fiber insertion port.

2. The optical-electrical converter as claim 1, wherein the optical fiber insertion port has multiple optical fiber insertion openings arranged in a two-by-two grid.

3. The optical-electrical converter as claim 1, wherein the housing has a baffle extended on a side on one end with the opening portion formed such that the baffle is bent downward to close on the opening portion.

4. The optical-electrical converter as claim 1, wherein the housing is provided with a fit portion cut from a top plate portion thereof and bent into the containing space in order to engage a concave portion formed on a surface of the converter body to secure an engagement of the housing on the converter body.

5. The optical-electrical converter as claim 4, wherein the concave portion has a guiding slope used to guide the fit portion until the fit portion touches a wall around the concave portion.

6. The optical-electrical converter as claim 1, wherein the housing has a pin connected electrically with a ground end on the circuit substrate of the optical fiber network equipment to transmit an electromagnetic interference (EMI) signal to the ground end on the circuit substrate.

7. The optical-electrical converter as claim 1, wherein two sides of an outer wall of the housing are protruded with an elastic portion in order for butting against the optical fiber network equipment elastically and maintaining a state of the optical fiber insertion port protruding from the optical fiber network equipment.

* * * * *